May 30, 1967

L. C. CHOUINGS 3,322,244

AUTOMATIC ADJUSTING MEANS FOR LIQUID-PRESSURE
OPERATED BRAKES

Filed Aug. 27, 1965

INVENTOR
Leslie Cyril Chouings
BY
ATTORNEY

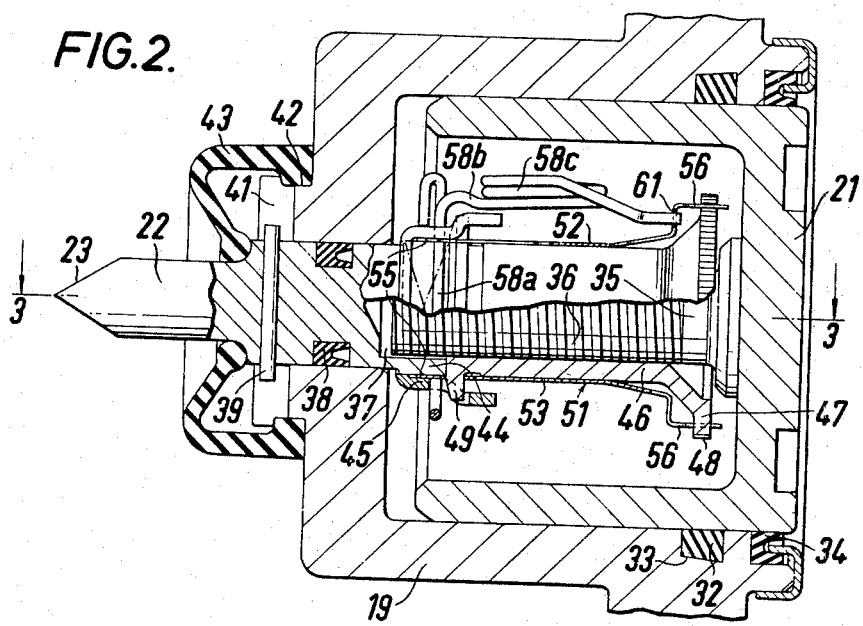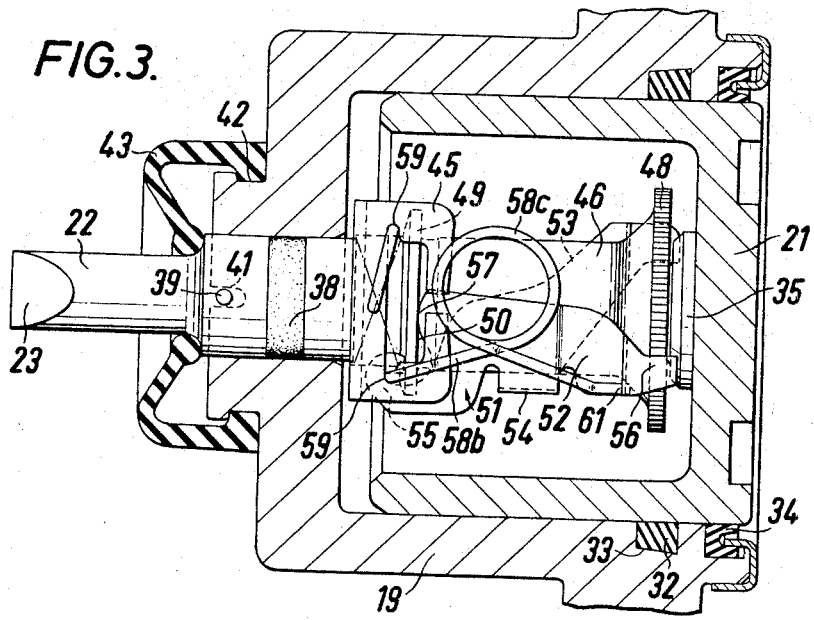

May 30, 1967 L. C. CHOUINGS 3,322,244
AUTOMATIC ADJUSTING MEANS FOR LIQUID-PRESSURE OPERATED BRAKES
Filed Aug. 27, 1965 4 Sheets-Sheet 3

INVENTOR
Leslie Cyril Chouinga
BY
Winter Tockman
ATTORNEY

United States Patent Office 3,322,244
Patented May 30, 1967

3,322,244
AUTOMATIC ADJUSTING MEANS FOR LIQUID-PRESSURE OPERATED BRAKES
Leslie Cyril Chouings, Leamington Spa, England, assignor to Automotive Products Company Limited, Leamington Spa, England
Filed Aug. 27, 1965, Ser. No. 483,097
Claims priority, application Great Britain, Sept. 2, 1964, 35,964/64
5 Claims. (Cl. 188—196)

This invention relates to automatic adjusting means for liquid-pressure operated brakes, particularly brakes of the disc type in which pads of friction material are pressed against opposite faces of a disc rotating with a wheel or other rotating member the rotation of which is to be slowed down or stopped. The automatic adjusting means according to the invention is incorporated in a motor-cylinder employed to apply a pad to one side of the disc. A similar motor cylinder may be provided to apply a second pad to the opposite side of the disc, or the one motor cylinder may be mounted so that the reaction therein is transmitted to the second pad to apply it to the other side of the disc.

It is the object of the invention to provide an improved automatic adjusting means.

According to the present invention automatic adjusting means for liquid pressure operated brakes comprises in combination with a liquid pressure motor cylinder for applying a brake pad to the surface of a brake disc, an externally screw-threaded stem fixed to the piston of said motor cylinder so as to project axially into the cylinder, an internally screw-threaded sleeve mounted on said stem and co-operating with an abutment on said motor cylinder to limit inward movement of said piston relative to said cylinder, said sleeve being formed with a peripheral series of ratchet teeth and with a surface facing in the direction of forward movement of the piston, pawl means pivotally mounted on a member which is held against forward movement with the piston caused by liquid pressure acting in the motor cylinder, said pawl means co-operating with the said surface on the sleeve so as to be rocked in a direction to move idly over the ratchet teeth by forward movement of the piston, and spring means acting on the pawl to return it through an operative stroke when the liquid pressure is released, to rotate the screw-threaded sleeve relative to the stem.

The member on which the pawl is pivotally mounted may be a plunger passing through the end of the cylinder opposite to the piston and abutting against a lever or other part by which it can be moved forwardly to apply mechanical pressure through the piston to the brake pad and so apply the brake mechanically.

The said plunger may be held against rotation in the cylinder and serves as an anchorage for the spring means to take the reaction of the spring load which produces the operative stroke of the pawl.

The spring means acting on the pawl may include an anchorage part by means of which it is positioned relative to the member held against forward movement, said anchorage part providing a pivotal mounting for the pawl. The invention is hereinafter described with reference to the accompanying drawings, in which:

FIGURE 2 is a longitudinal section through the motor cylinder shown in FIGURE 1, on a larger scale, showing the adjusting means;

FIGURE 3 is a section on a plane at right angles to the section of FIGURE 2, and on the same scale, on the line 3—3 of FIGURE 2;

Figure 1:
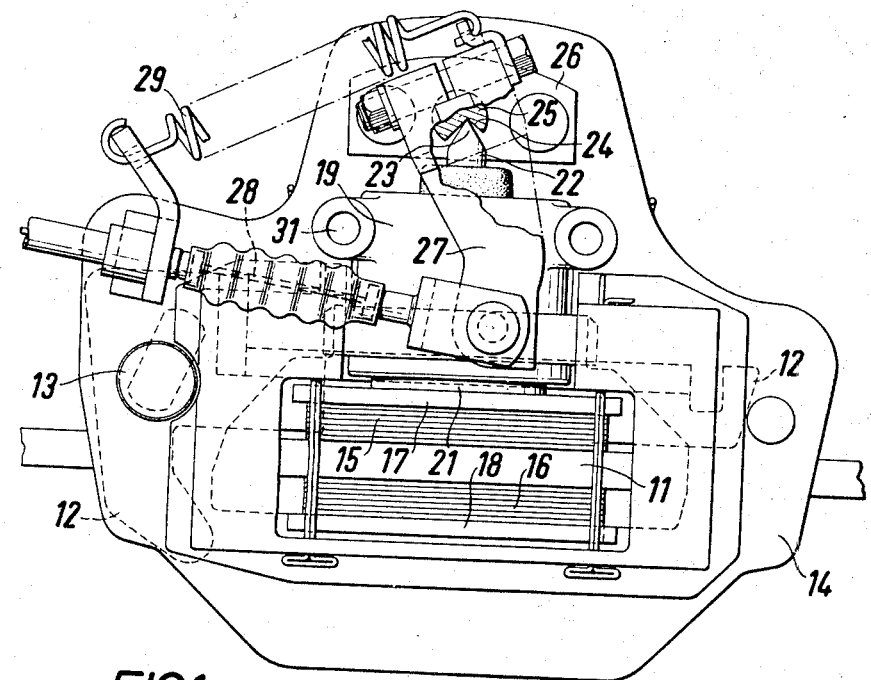
FIGURE 1 is a plan view of a vehicle disc brake having automatic adjusting means according to the invention, the adjusting means not being shown as it is within the fluid pressure motor cylinder.

Referring to FIGURE 1 of the drawings, the brake comprises a metal disc 11 mounted on a wheel or axle to be braked, the said wheel or axle not being shown in the drawing. A support, shown in dotted lines at 12, is fixedly mounted alongside the disc, and has pivotally attached to it at 13 a substantially flat movable member 14 in the form of a closed loop, the plane of the said movable member 14 being chordal to the brake disc 11 so that a segment of the said disc projects through the opening in the loop-shaped movable member. A pair of brake pads 15 and 16, supported by backing plates 17 and 18 respectively, are mounted in the opening in the loop-shaped movable member and are rstrained against movement in the plane of the brake disc 11 by suitable abutments on the said member, the backing plate 18 being supported in a direction perpendicular to the said plane by one edge of the opening. A liquid pressure motor cylinder 19, mounted in a lateral extension of the opening, has slidable in it a piston 21 which abuts against the other backing plate 17. Thus pressure acting in the motor cylinder 19 urges the pad 15 against one side of the disc, and the reaction in the said motor cylinder, acting through the movable member 14, urges the brake pad 16 against the other side of the disc.

A plunger 22 which extends into the motor cylinder 19 through its outer end, and is able, as will be hereinafter described, to apply a mechanical thrust to the piston 21, has its outer end formed to a V shape as shown at 23, and engages in a V-shaped notch 24 in a spindle 25 rotatably mounted in a bracket 26 on the movable member 14, the notch 24, as shown, being offset relative to the axis of the spindle 25 so that turning of the spindle causes the plunger 22 to move axially. A lever 27, clamped to the spindle 25, is connected by a cable 28 to a mechanical brake operating device such as a hand lever, (not shown) by means of which the spindle can be operated to apply the brake mechanically. A tension spring 29 acts on the lever 27 in the brake releasing direction.

Referring to FIGURES 2 to 6 of the drawing, the motor cylinder 19 is open at its front end, and closed at its rear end, and the piston 21 slidably mounted in it is of cup-like form. The open end of the piston 21 faces the closed end of the cylinder. The closed end of the piston 21 abuts against the brake pad, so that liquid pressure admitted to the cylinder through an inlet 31 (FIGURE 1) presses the brake pad 15 against the brake disc 11. A resilient packing ring 32 mounted in a circumferential groove 33 in the cylinder wall and engaging with the peripheral wall of the piston provides a fluid-tight seal between the cylinder and the piston, the edge of the said groove 33 nearest the open end of the cylinder 19 being chamfered so that the packing ring is distorted when the piston moves forwardly and exerts a small returning force on the piston to move it inwardly when the pressure is relieved. A cup packing 34, mounted in a counterbore at the open end of the cylinder, prevents the entry of water or foreign matter into the cylinder and protects the packing ring 32 against damage.

The piston 21 has secured to the internal face of its closed end a stem 35, screw-threaded at 36, and the plunger 22 is recessed at its inner end, at 37, to receive the end of the stem 35. The plunger is grooved circumferentially to receive a packing ring 38 preventing leakage of liquid between the said plunger and the cylinder, and is held against rotation by a diametral pin 39 the ends of which project into a diametral groove 41 in a boss 42 on the end of the cylinder. A flexible cover 43 is provided around the plunger to prevent the entry of water and foreign matter.

The inner end 44 of the plunger 22 is of square cross section externally, and a U-shaped bracket 45, having a square opening in its central portion to engage the square inner end 44 of the plunger 22, has its limbs extending, parallel to two opposite sides of the said end 44, towards the closed end of the motor cylinder 19. A sleeve 46, screw-threaded internally to engage the screw-thread 36 on the stem 35, has an external flange at each end, the flange 47 at the end adjacent the closed end of the cylinder being formed on its periphery with ratchet teeth 48, and the flange 49 at the other end having a flat face 50 on its side facing the closed end of the cylinder.

Figure 6:
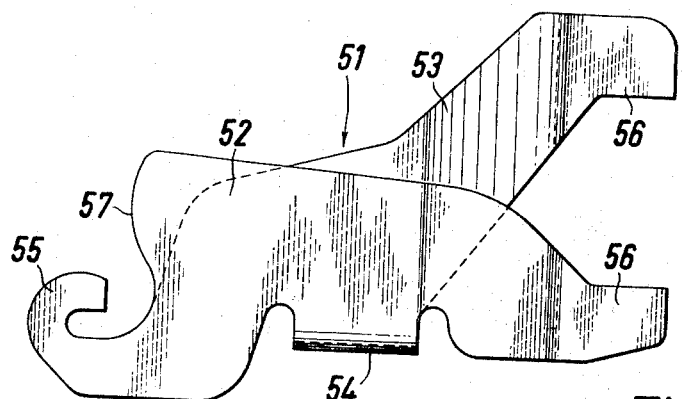
FIGURE 6 is a side view of the pawl unit shown in FIGURES 2, 3 and 4.

A pawl unit 51, shown separately in FIGURE 6, comprises two limbs 52 and 53, spaced apart and connected one to the other by a bridge-piece 54, each limb having a hook member 55 at one end and having a finger 56 at the other end to engage the ratchet teeth 48 on the sleeve. The limb 52 of the pawl unit is also provided with a convexly curved edge portion 57, the purpose of which will be described below.

Figure 4:
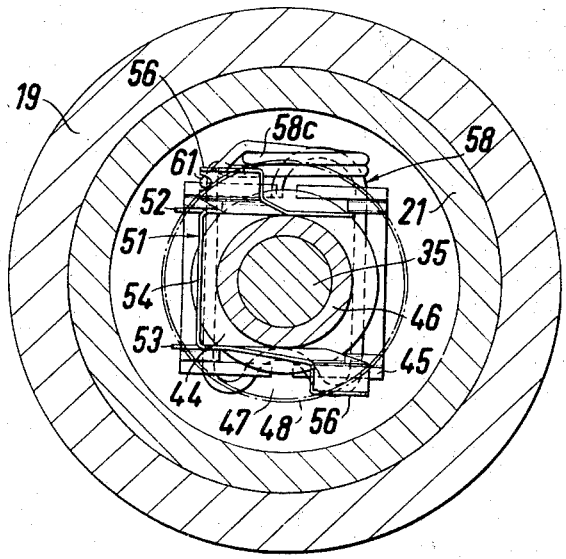
FIGURE 4 is an end view of the adjusting means looking from the right in FIGURE 2, some parts being broken away.
Figure 5:
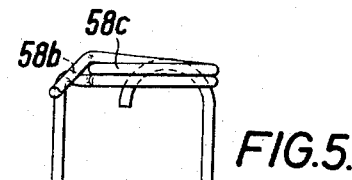
FIGURE 5 is an end view of the spring shown in FIGURES 2, 3 and 4.
Figure 9:
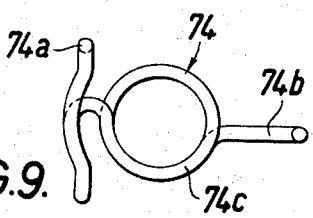
FIGURE 9 is a side view of the spring shown in FIGURES 7 and 8.
Figure 10:
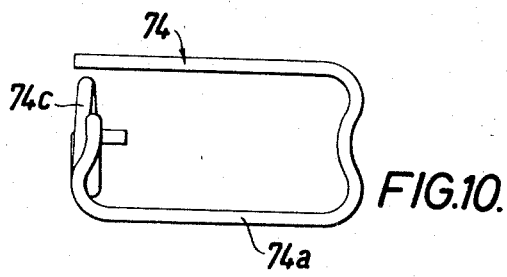
FIGURE 10 is an end view of the spring shown in FIGURE 9.
Figure 7:
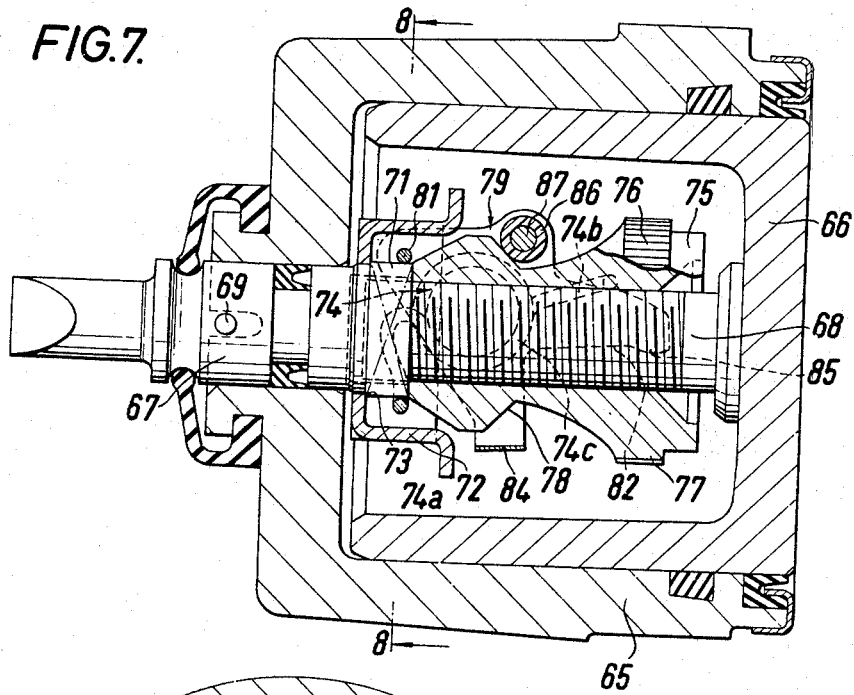
FIGURE 7 is a section, similar to FIGURE 2, showing a modified adjusting means.
Figure 8:
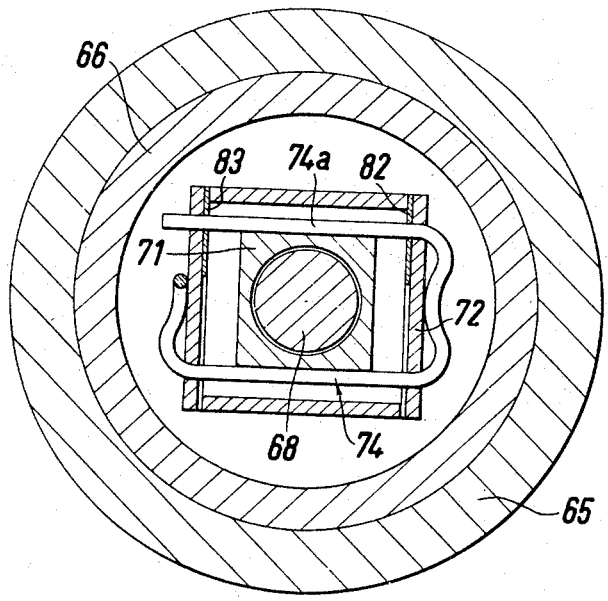
FIGURE 8 is a section on the line 8—8 of FIGURE 7.

A spring 58, shown separately in FIGURE 5, provides the force to produce the operative stroke of the pawl unit, and also provides a pivot for the pawl. This spring, which is shown in FIGURES 2, 3 and 4 in its assembled condition and is shown separately in FIGURE 5, comprises a substantially rectangular loop portion 58a which, in the assembled condition of the adjuster, surrounds the square inner end 44 of the plunger 22, and a limb 58b, extending generally in a direction normal to the plane of the loop portion 58a and having a coil 58c formed in it. The hook members 55 on the pawl unit 51 engage with one side of the loop portion 58a of the spring 58, as best shown in FIGURE 3, each of the hook members lying between one side of the square inner end of the plunger 22 and one limb of the bracket 45, and the said loop portion 58a of the spring being located in a plane perpendicular to the axis of the plunger by engagement in notches 59 in the ends of cut-outs in the limbs of the bracket 45. The free end of the limb 58b of the spring engages at 61 with the limb 52 of the pawl unit having the convexly-curved edge portion 57, that edge portion engaging as shown in FIGURE 3, with the flat face 50 on the flange 49.

The spring 58 acts on the limb 52 of the pawl unit 51 to rotate it about its pivot in a direction to urge the edge portion 57 against the flat face 50 and the ratchet teeth 48 on the flange 47 are so arranged that the finger 56 on the pawl limb 52, when moving in the direction in which it is urged by the spring, rotates the sleeve 46 in a direction such that it moves on the stem 35 away from the closed end of the piston 21.

The adjusting means shown in FIGURES 2 to 6 operate in the following manner. Liquid under pressure admitted to the cylinder 19 acts on the piston 21 to urge it outwardly relative to the said cylinder, and the sleeve 46 moves with the piston. The plunger 22 is held against movement by the liquid pressure acting in the cylinder. Due to the engagement of the edge portion 57 on the limb 52 of the pawl unit with the surface 50, the said pawl unit tends to turn, against the resistance of the spring 58, about its pivot, the finger 56 on the said limb 52 riding idly over the ratchet teeth 48. The finger 56 on the other limb 53 of the pawl unit, which engages the ratchet teeth 48 at a point substantially diametrically opposite to that at which the finger 56 on the limb 52 engages, holds the sleeve against backward rotation, but does not exert sufficient force to rotate the sleeve forwardly, relative movement of the two pawl limbs being permitted by flexing of the bridge piece 54.

When the brake is released, the pawl limb 52 is urged in the opposite direction by the spring 58. If the piston movement during brake application was sufficient for the pawl limb to engage a fresh tooth on the flange 47, the movement of the pawl limb during the brake release rotates the sleeve 46 through a small angle, thus slightly increasing the total length of the stem-and-sleeve combination.

The sleeve 46 abuts against the inner end of the plunger 22, and the normal position of the plunger, in an axial direction, is determined by its engagement with the notch 24 in the spindle 25, the spindle being held against rotation from its normal position in a direction to allow further outward movement of the plunger. The spindle 25 thus constitutes a stop limiting the retraction of the brake pad on which the piston 21 acts.

Mechanical operation of the brake is effected by applying a pull to the cable 28, which turns the spindle 25 through the lever 27 and urges the plunger 22 inwardly. The thrust applied to the plunger is transmitted mechanically through the sleeve 46 and stem 36 to the piston 21, and so to the brake pad 15. The adjusting means does not operate when the brake is mechanically applied.

In the modified form of adjusting means shown in FIGURES 7 to 10, the cylinder 65, piston 66, plunger 67 and stem 68 are closely similar to the corresponding parts in FIGURES 2 to 6, the plunger being similarly held against rotation by a diametral pin 69 and having a square inner end portion 71. A bracket 72, similar to the bracket 45 shown in FIGURES 2 to 6, but supported against a shoulder 73 on the plunger so that it is held against inward axial movement relative thereto, retains in position around the square portion of the plunger a square loop 74a of a spring 74 having an arm 74b, including a coil 74c, projecting towards the closed end of the piston.

A sleeve 75 having screw-threaded engagement with the stem 68 and having ratchet teeth 76 around an enlarged portion 77 thereof, has a frusto-conical surface 78 converging towards the closed end of the piston. A pawl unit 79, pivoted at 81 on one side of the spring loop portion 74a comprises, like the pawl unit 51 previously described, two limbs 82 and 83 lying on opposite sides of the sleeve 75 and connected one to the other by a bridge-piece 84, each limb 82 and 83 including a finger 85 to engage the ratchet teeth 76. A roller 86, mounted on a spindle 87 extending between the limbs 82 and 83 of the pawl unit, co-operates with the surface 78 on the sleeve 75, and the arm 74b of the spring 74 acts on the limb 82 of the pawl unit to urge the roller 86 against the said surface. The limb 83 of the pawl does not, in this case, act as a holding pawl, but merely rides on the toothed surface of the sleeve to hold the other limb against outward movement away from the teeth.

The form of adjusting means shown in FIGURES 7 to 10 operates in the following manner.

Liquid pressure acting in the cylinder 65 moves the piston 66 outwardly, the sleeve 75, due to its screw-threaded engagement with the stem 58, moving with the piston. Since the square loop portion 74a of the spring 74 is held against outward movement by the bracket 72 and plunger 67, and the plunger is held against movement by the liquid pressure in the cylinder, the roller 86 rides up the surface 78 and the pawl unit 79 moves about its pivot, against the resistance of the spring 74, being returned by the spring when the brake is released. Thus adjustment is effected if the movement of the piston exceeds a predetermined limit, as already described.

The adjusting means above described, when embodied in a brake as described with reference to FIGURE 1, provide adjustment for both brake pads 15 and 16, since the movement of the piston 21 in the cylinder 19 applies both pads to the disc, one directly and one through the reaction load on the movable member 14.

The adjusting means may also be applied to disc brakes in which the pads on opposite sides of the disc are operated by separate fluid pressure cylinders mounted on a fixed support, separate adjusting means then being provided in each of the said cylinders.

I claim:

1. Automatic adjusting means for liquid pressure operated brakes comprising, in combination with a liquid pressure motor cylinder for applying a brake pad to the surface of a brake disc, an externally screw-threaded stem fixed to the piston of said motor cylinder so as to project axially into the cylinder, an internally screw-threaded sleeve mounted on said stem and co-operating with an abutment on said motor cylinder to limit inward movement of said piston relative to said cylinder, said sleeve being formed with a peripheral series of ratchet teeth and with a surface facing in the direction of forward movement of the piston, pawl means pivotally mounted on a member which is held against forward movement with the piston caused by liquid pressure acting in the motor cylinder, said pawl means cooperating with the said surface on the sleeve so as to be rocked in a direction to move idly over the ratchet teeth by forward movement of the piston, and spring means acting on the pawl to return it through an operative stroke when the liquid pressure is released, to rotate the screw-threaded sleeve relative to the stem.

2. Automatic adjusting means according to claim 1, wherein the member on which the pawl is pivotally mounted is a plunger passing through the end of the cylinder opposite to the piston and abutting against a lever or other part by which it can be moved forwardly to apply mechanical pressure through the piston to the brake pad and so apply the brake mechanically.

3. Automatic adjusting means according to claim 2, wherein the said plunger is held against rotation in the cylinder and serves as an anchorage for the spring means to take the reaction of the spring load which produces the operative stroke of the pawl.

4. Automatic adjusting means according to claim 3 wherein the spring means includes an anchorage part by means of which it is positioned relative to the member held against forward movement, said anchorage part providing a pivotal mounting for the pawl.

5. Automatic adjusting means according to claim 4, wherein the said anchorage part of the spring means comprises a substantially rectangular loop surrounding a square portion of the plunger, two opposite sides of the loop extending through cut-outs in limbs of a U-shaped bracket mounted on the plunger, the said limbs extending parallel to two opposite sides of the square portion of the plunger and the cut-outs being shaped to retain the loop in a plane substantially perpendicular to the axis of the plunger.

References Cited

UNITED STATES PATENTS

| | | | |
|---|---|---|---|
| 2,669,327 | 2/1954 | Chamberlain et al. | 188—72 |
| 3,158,234 | 11/1964 | Henderson | 188—196 |

DUANE A. REGER, *Primary Examiner.*